(12) United States Patent
Webb

(10) Patent No.: US 7,021,345 B2
(45) Date of Patent: Apr. 4, 2006

(54) BALL AND SOCKET BREAKAWAY FITTING

(75) Inventor: Michael C. Webb, Raleigh, NC (US)

(73) Assignee: Environ Products, Inc., Smithfield, NC (US)

( * ) Notice: Subject to any disclaimer, the term of this patent is extended or adjusted under 35 U.S.C. 154(b) by 0 days.

(21) Appl. No.: 11/168,360

(22) Filed: Jun. 29, 2005

(65) Prior Publication Data

US 2005/0236064 A1    Oct. 27, 2005

Related U.S. Application Data

(60) Provisional application No. 60/456,252, filed on Mar. 21, 2003.

(51) Int. Cl.
*B65B 1/04*    (2006.01)

(52) U.S. Cl. .................. 141/382; 141/98; 141/206; 141/392; 137/614.04; 137/68.11; 285/1

(58) Field of Classification Search .................. 141/98, 141/206, 382–387, 392; 137/614.03, 614.04, 137/614.05, 68.11; 251/149.6, 149.7; 285/308, 285/315, 1
See application file for complete search history.

(56) References Cited

U.S. PATENT DOCUMENTS

| 3,056,613 A | | 10/1962 | Dale |
| 4,543,994 A | * | 10/1985 | Johnson et al. ........ 137/614.04 |
| 4,800,913 A | | 1/1989 | Nitzberg et al. |
| 4,899,792 A | * | 2/1990 | Podgers ..................... 141/382 |
| 5,228,474 A | | 7/1993 | Nimberger |

FOREIGN PATENT DOCUMENTS

DE    40 847 A    11/1965

* cited by examiner

*Primary Examiner*—Timothy L. Maust
(74) *Attorney, Agent, or Firm*—Drinker Biddle & Reath LLP

(57) ABSTRACT

A hose breakaway fitting for a fuel hose and fuel dispenser that comprises of an inner ball-shaped valve section and an outer socket-shaped breakaway section. The valve section is connected to the dispenser's fuel outlet and the breakaway section is connected to one end of the fuel hose. In the event that a vehicle drives away with the fuel hose nozzle still lodged inside its fuel tank, the breakaway section swivels and separates from the valve section that automatically shuts off the flow of fuel to prevent a hazardous situation.

4 Claims, 3 Drawing Sheets

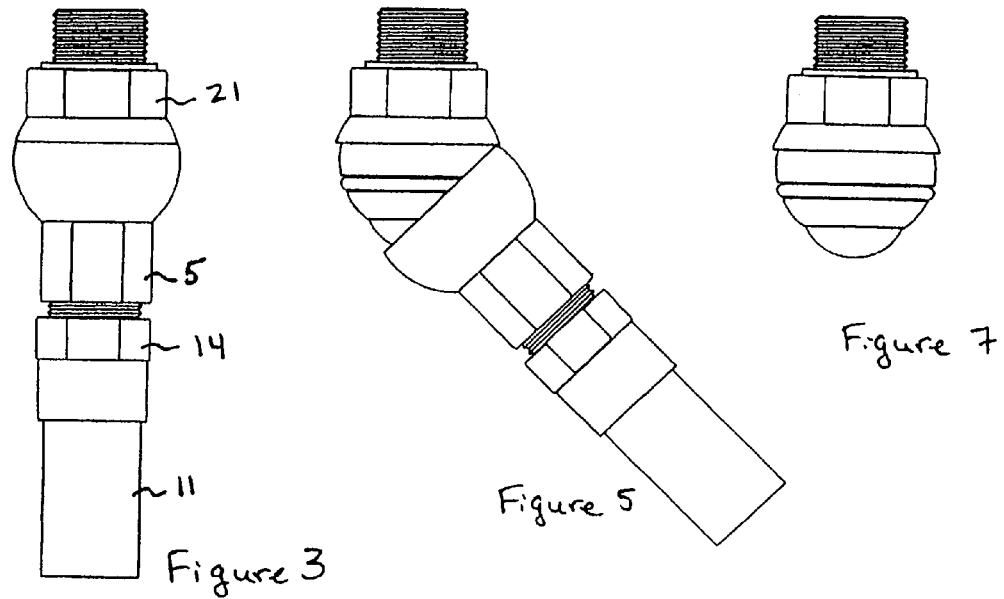
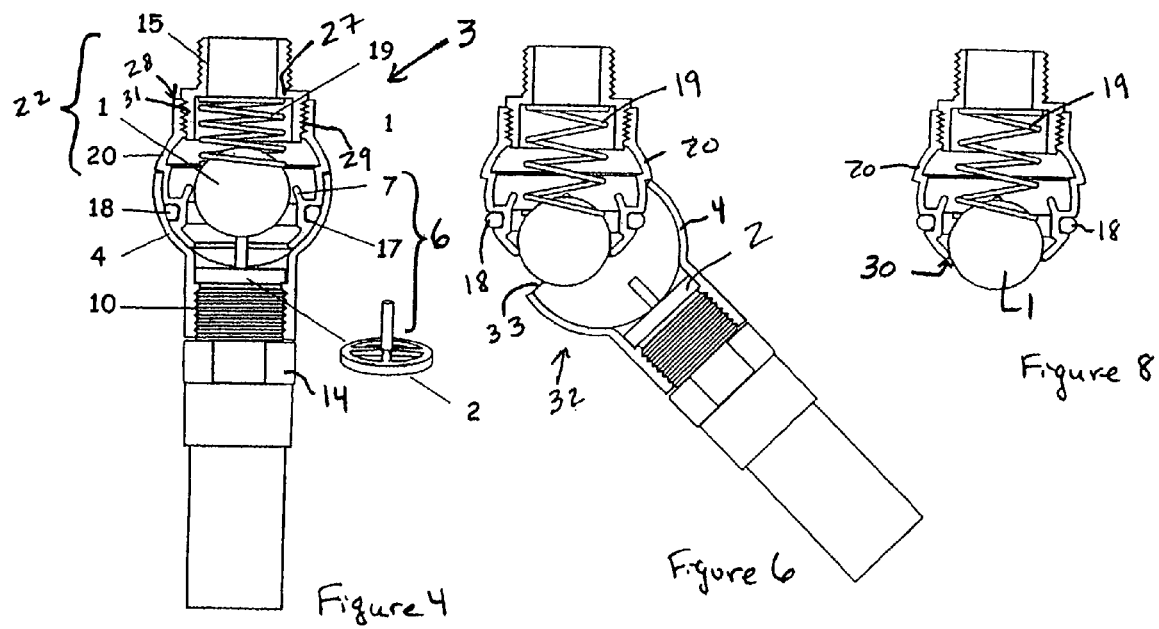

BALL AND SOCKET BREAKAWAY FITTING

This application claims priority from a provisional application, Ser. No. 60/456,252, filed Mar. 21, 2003.

FIELD OF THE INVENTION

The present invention relates to a breakaway fitting. More particularly, the invention is related to a breakaway fitting for connecting the fuel outlet on a fuel dispenser to a fuel hose and nozzle assembly.

BACKGROUND OF THE INVENTION

A vehicle 23 receiving fuel from a fuel dispenser 25 is shown in FIG. 1. During the fueling process, fuel flows from the fuel dispenser 25, through a dispenser outlet 9, through a fuel hose assembly 11, through a fuel nozzle 12, and into the fuel tank 24 of the vehicle 23.

Occasionally, while filling a customer's vehicle 23 with fuel, the customer will get into the vehicle 23 and drive off while the fueling nozzle 12 is still inserted in the vehicle's fuel tank 24. The resulting tension on the fuel hose assembly 11 may pull over the fuel dispenser 25 and separate the fuel dispenser 25 from its base. In addition, the vehicle 23 may drag the fuel dispenser 25 for some distance. This circumstance could destroy a costly fuel dispenser 25 and possibly create a fire hazard. The risk of fire is higher if fuel is being dispensed into the vehicle 23 at the time of departure. Without the ability to automatically shut off this flow of fuel, the fuel could be dispensed onto the fueling island and potentially cause a serious fire hazard or environmental contamination.

To prevent this circumstance, breakaway fittings 8, 13, 16 as shown in FIG. 2 are connected to the fueling hose so that the fuel hose assembly 11 will separate from the fuel dispenser 25 to prevent the dispenser 25 from being pulled down. Breakaway fittings 8, 13, 16 are designed to minimize damage to the fuel dispenser 25 and to stop the flow of fuel from the fuel dispenser 25 in the event that a vehicle 23 drives away with the fuel hose nozzle 12 still lodged in its fuel tank 24.

Three different types of breakaway fittings are shown in FIG. 2: a "hose break" type, a "nozzle break" type, and a "dispenser break" type of breakaway fitting. The hose break fitting 13 is installed between two hose assemblies. One hose assembly 26 known as a "whip hose" assembly is short (approximately 1 foot) and the other 11 is long (approximately 10 feet). The hose break fitting 13 is designed to separate if the separation force is in-line with the fitting. This requires the body of the breakaway fitting 13 to point in the direction of the departing vehicle 23 at the time of separation. The directional alignment is achieved by installing the whip hose 26 between the fuel dispenser 25 and the breakaway fitting 13 to allow for the desired directional movement.

A disadvantage of the hose break fitting 13 is the additional cost for the whip hose assembly 26. A whip hose assembly 26 with two couplings can cost as much as the primary hose itself. In addition, this type of breakaway 13 and whip hose assembly 26 are usually not attractive in appearance. They are bulky and heavy and can damage the finish on the dispenser 25 due to abrasion from constant handling.

A nozzle break fitting 16 is installed between the hose assembly 11 and the fueling nozzle 12. Like the hose break 13 breakaway fitting, a nozzle break breakaway fitting 16 is designed to separate if the separation force is in-line with the fitting 16. This requires the body of the breakaway fitting 16 to point in the direction of the departing vehicle 23 at the time of separation. The directional movement for directional alignment is achieved by movement of the hose assembly 11 that is installed between the fuel dispenser 25 and the breakaway fitting 16 in response to tension cause by the moving vehicle 23. A disadvantage of the nozzle break fitting 16 is that it is located at the nozzle 12 which makes the nozzle 12 heavier and more cumbersome to maneuver.

A dispenser break fitting 8 is installed between the fuel dispenser 25 and the fuel hose assembly 11. This breakaway fitting 8 is designed to separate if a pulling force is applied at an angle to the breakaway fitting 8. This design does not require the body of the breakaway fitting 8 to point in the direction of the departing vehicle 23 at the time of separation. The dispenser break fitting 8 is an improvement over the hose break fitting 13 and the nozzle break fitting 16 because it does not require a whip hose 26 nor does it add any additional weight to the fueling nozzle 12.

SUMMARY OF THE INVENTION

The present invention is a fuel hose breakaway assembly having a valve section and a breakaway section. The valve section includes a valve body with one end arranged to be coupled to the breakaway body of the breakaway section and another end arranged to be coupled to a fuel dispenser outlet port. The breakaway section includes a breakaway body with one end arranged to be coupled to the valve body and another end arranged to be coupled to a fuel line assembly.

The valve body is spiracle-shaped and has an external o-ring and an internal seat for sealing a valve. The breakaway body is spiracle-shaped and arranged to externally engage the valve body and its o-ring. The breakaway body is arranged to disengage the valve to allow the flow of fuel from the fuel dispenser through the breakaway assembly and into the fuel line assembly when the valve body and breakaway body are coupled together. When the breakaway body is de-coupled from the valve body, the valve is engages with the internal seat of the valve body to automatically shut off the dispensing of fuel.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 3 is a front plan view of a breakaway fitting assembly according to a first exemplary embodiment of the present invention.

FIG. 4 is a cross-sectional view of the breakaway fitting assembly shown in FIG. 3.

FIG. 5 is a front plan view of a breakaway fitting assembly according to a first exemplary embodiment of the present invention in an angled position.

FIG. 6 is a cross-sectional view of the breakaway fitting assembly shown in FIG. 5.

FIG. 7 is a front plan view of the valve body of a breakaway fitting assembly according to a first exemplary embodiment of the present invention.

FIG. 8 is a cross-sectional view of the valve body shown in FIG. 7.

DETAILED DESCRIPTION OF THE INVENTION

Figure 1:
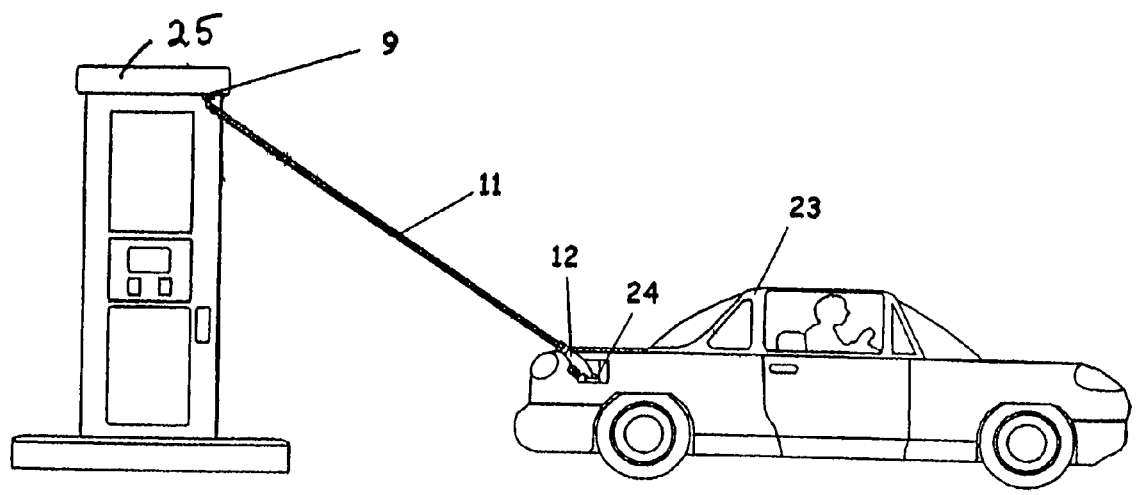
FIG. 1 is a front plan view of a conventional fuel dispenser coupled via a fuel hose assembly to the fuel tank of a vehicle.
Figure 2:
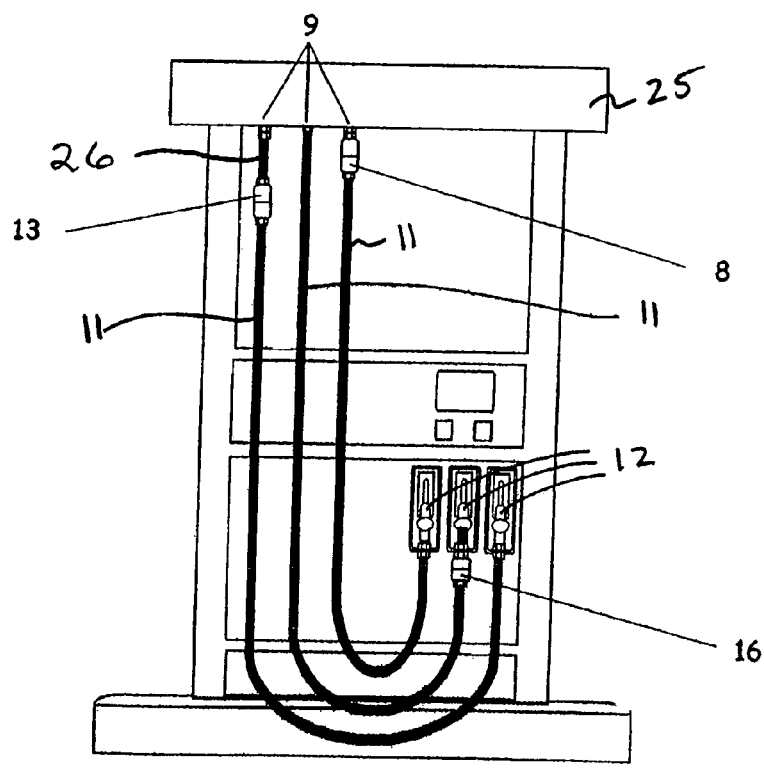
FIG. 2 is a front plan view of a fuel dispenser having three different conventional breakaway fittings.

Referring to the drawings, wherein like reference numerals illustrate corresponding or similar elements throughout the several views, there is shown in FIGS. 3–8 a dispenser break type breakaway fitting assembly 3 according to the present invention. The breakaway fitting assembly 3 is configured in a ball and socket type arrangement. The breakaway fitting assembly 3 includes an inner ball-shaped valve section 22 and an outer socket-shaped breakaway section 6.

The valve section 22 includes a valve body 20 that is connected to a fuel dispenser outlet 9 and the breakaway section 6 includes a breakaway body 4 that is connected to a fuel hose coupling 14 at one end of a fuel hose assembly 11. During normal operation, the ball-shaped valve section 22 is coupled to the socket-shaped breakaway section 6 and fuel may flow through the assembly 3.

If a vehicle 23 drives away with the fuel hose nozzle 12 still lodged inside its fuel tank 24, the tension exerted by the fuel hose assembly 11 on the breakaway body 4 will cause it to swivel in the direction of the departing vehicle 23 and separate from the valve body 20. The flow of fuel is automatically shut off upon the separation of the breakaway body 4 from the valve body 20, thereby preventing a hazardous condition. The ability to swivel allows the fueling hose 11 to be decoupled from the fuel dispenser outlet 9 by applying a force in a direction of the departing vehicle 23 to the breakaway body 4 without the need for a whip hose.

The valve section 22 as shown in FIGS. 3–8 includes a valve body 20, a threaded bushing 27, a ball seal 1, a spring 19 and a rubber o-ring 18. The valve body 20 has an opening 28 on one end that is large enough to insert the ball seal 1 and has machined threads 29 to screw-in one end of the threaded bushing 27 to entrap the ball seal 1. The interior of the valve body 20 has three or more stand-off profiles or centering arms 7 to center the ball seal 1. A round outlet opening 30 (i.e., a ball seat) at the bottom end of the valve body 20 is smaller in diameter than the ball seal 1.

The exterior of the valve body 20 has a machined groove 17 for installation of the rubber o-ring 18 and has a multi-sided hex section 21 for securing the valve section 22 when tightening it to the fuel dispenser 25. The rubber o-ring 18 seals the connection between the valve body 20 and the breakaway body 4. The threaded bushing 27 is a double threaded bushing whereby one threaded section 31 threads into the valve body 20 and the other threaded end 15 threads into the fuel dispenser outlet port 9.

Figure 9:
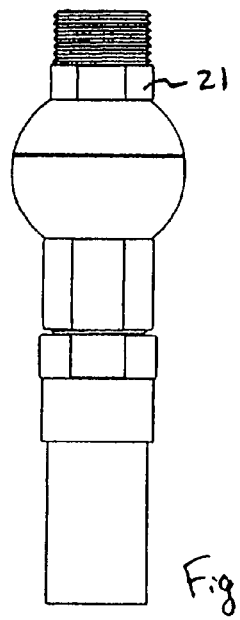
FIG. 9 is a front plan view of a breakaway fitting assembly according to a second exemplary embodiment of the present invention.
Figure 11:
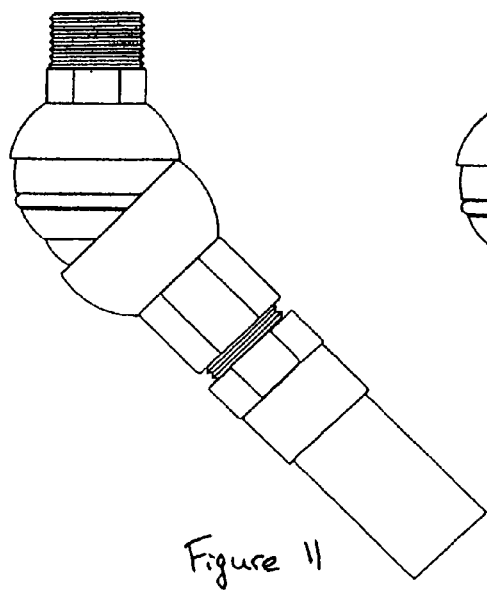
FIG. 11 is a front plan view of a breakaway fitting assembly according to a second exemplary embodiment of the present invention in an angled position.
Figure 13:
FIG. 13 is a front plan view of the valve body of a breakaway fitting assembly according to a second exemplary embodiment of the present invention.
Figure 10:
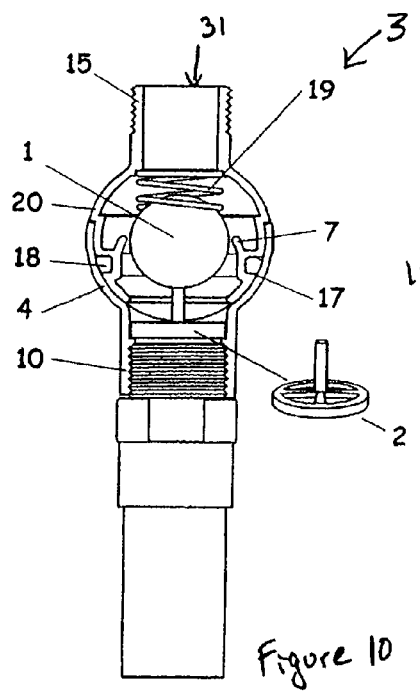
FIG. 10 is a cross-sectional view of the breakaway fitting assembly shown in FIG. 9.
Figure 12:
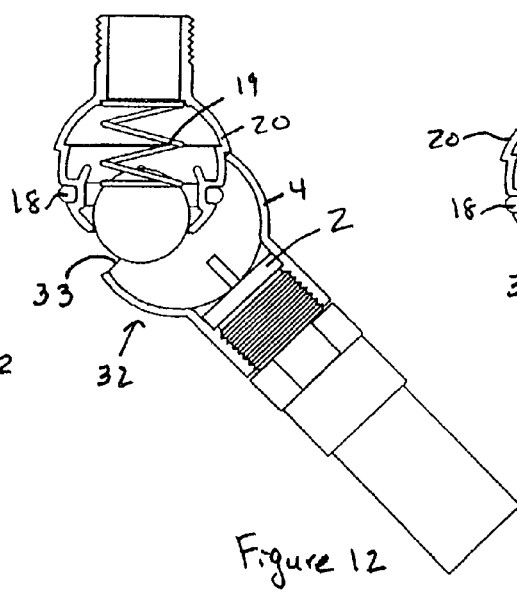
FIG. 12 is a cross-sectional view of the breakaway fitting assembly shown in FIG. 11.
Figure 14:
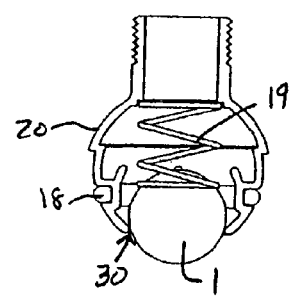
FIG. 14 is a cross-sectional view of the valve body shown in FIG. 13.

According to a second exemplary embodiment of the invention as shown in FIGS. 9–14, the outside of the valve body 20 has a male threaded section 15 and a hex section 21 for threading into the dispenser outlet port 9. In addition, the outside of the valve body 20 also has a machined groove 17 for the rubber o-ring 18.

The interior of the valve body 20 has three or more stand-off profiles 7 to center the ball seal 1 and has a round outlet opening 30 (i.e., a ball seat) at the bottom end that is smaller in diameter than the ball seal 1. The valve body 20 has another opening 34 at its opposite end that is also smaller than the ball seal 1. The ball seal 1 is made of a compressible elastomeric material so that it may be compressed and inserted into the valve body 20. Once inside the valve body 20, the ball seal 1 expands to its original shape. In an exemplary embodiment, the ball seal 1 comprises viton rubber. In an exemplary embodiment, the ball seal 1 has a hardness of between 60–80 D (durometers).

The breakaway section 6 is comprised of a semi-spherical shaped fitting or body 4 that has an opening on its lower end that has female pipe threads 10 for connection to the hose assembly coupling 11 and a hex portion 5 for securing the breakaway section 6 while tightening the threaded coupling of the hose assembly 11. On the upper portion of the breakaway section 6, there is a semi-spherical dome 32 having a large opening 33. The inside shape and dimension of this semi-spherical dome 32 mirrors the outside shape and dimension of the valve body 20.

Both the first and second embodiments of the valve section 22 have a spring loaded ball seal 1. The spring 19 applies a force to the ball seal 1 in the direction of the internal ball seat 30. A ball standoff 2 is positioned inside the breakaway section 6 and prevents the ball seal 1 from sealing to permit the fuel to flow through it when the breakaway section 6 is coupled to the valve section 22. As the breakaway body 4 separates from the valve body 20, the ball standoff 2 disengages from the ball seal 1. This allows the pressure exerted by the spring 19 against the ball seal 1 to move the ball seal 1 into the opening or ball seat 30 and seal-off the fuel inside the valve body 20. This shuts off the flow of fuel automatically upon the separation of the breakaway section 6 from the valve body section 22.

The semi-spherical dome portion 32 is designed to be press fitted over the ball section of the valve body 20 in such a manner that it is forced to expand in order to fit onto the valve body 20. The amount of force and expansion required to install the breakaway section 6 will also determine the amount of force required for the breakaway section 6 to breakaway in the event of a drive-off. Currently, Underwriters Laboratories has specified in their UL Standard 567, entitled Pipe Connectors for Petroleum Products and LP Gas, that the minimum breakaway force for a 5/8 inch fuel hose is 350 pounds. This means that the relationship or engagement between the valve body 20 and the breakaway body 4 for a 5/8 inch breakaway fitting must separate when the pulling force is greater than 350 pounds. In an exemplary embodiment, the breakaway fitting 3 will not separate unless the pulling force on the breakaway section 6 is greater than 350 pounds.

The structure of the breakaway body 4 and valve body 20 may be manufactured to meet the required minimum separation force for a particular application. Exemplary manufacturing variations include the size of the opening 33 may be varied with respect to the diameter of the valve body 20, the amount of overlap of the breakaway body 4 fit over the valve body 20 may be varied, and the thickness and/or flexibility of the materials used may be varied. For example, if the breakaway body 4 is comprised of a less flexible material, it will take a greater separation force for the valve body 20 to be separated from the breakaway body through the opening 33.

Other variations of the apparatus can be conceived that provide the beneficial results of the invention while not deviating from the basic design features described herein.

What is claimed is:

1. A fuel dispenser having a fuel hose breakaway assembly comprising in combination:
    a fuel dispenser having an outlet, a fuel nozzle attached to a fuel hose, said fuel hose being connected to the dispenser outlet through a breakaway assembly, said breakaway assembly comprising,
    an inner ball-shaped valve section coupled with an outer socket-shaped breakaway section, said inner ball-shaped valve section comprises a valve body connected to the dispenser outlet, a threaded bushing, a ball seal, a spring, a rubber o-ring and a ball seat, said valve body having a semi-spherical outer shape and dimension at one end and an opening on an end into which to insert the ball seal and threads to secure an end of the threaded bushing to enclose the ball seal, and said breakaway section comprises a breakaway body connected to a fuel hose coupling at one end of a fuel hose and a ball standoff positioned inside the breakaway section,
    wherein said spring in said valve section is disposed to apply force to the ball seal in the direction of the ball seat and against the ball standoff which prevents the ball seal from completely sealing off fuel flow through the assembly until the breakaway section is separated from the valve section.

2. The fuel dispenser having a fuel hose breakaway assembly of claim 1, wherein:
    said breakaway section further comprises,
    a semi-spherical fitting having an opening at one end that has pipe threads for connection to the fuel hose coupling, a hex portion for securing the breakaway section while tightening the threaded coupling of the fuel hose assembly,
    said breakaway section further comprising a semi-spherical dome having a large opening, said dome having an inside shape and dimension corresponding to the outside shape and dimension of said spherical end of said valve body.

3. The fuel dispenser having a fuel hose breakaway assembly of claim 1, wherein:
    the valve body has a male threaded section on its outer surface and a hex section for threading into the dispenser outlet port, and further comprises a groove in which is disposed the o-ring.

4. The fuel dispenser having a fuel hose breakaway assembly of claim 3 wherein:
    the valve body comprises a plurality of stand-off profiles to center the ball seal and has a round outlet opening at a first end that is smaller in diameter than the ball seal; said valve body comprises a second opening at its opposite end that is also smaller than the ball seal; said ball seal being compressible for insertion into the valve body.

* * * * *